July 26, 1960 A. K. CRABILL 2,946,581
FURNACE FOR REDUCING METALLIC ORES
Filed Feb. 24, 1958
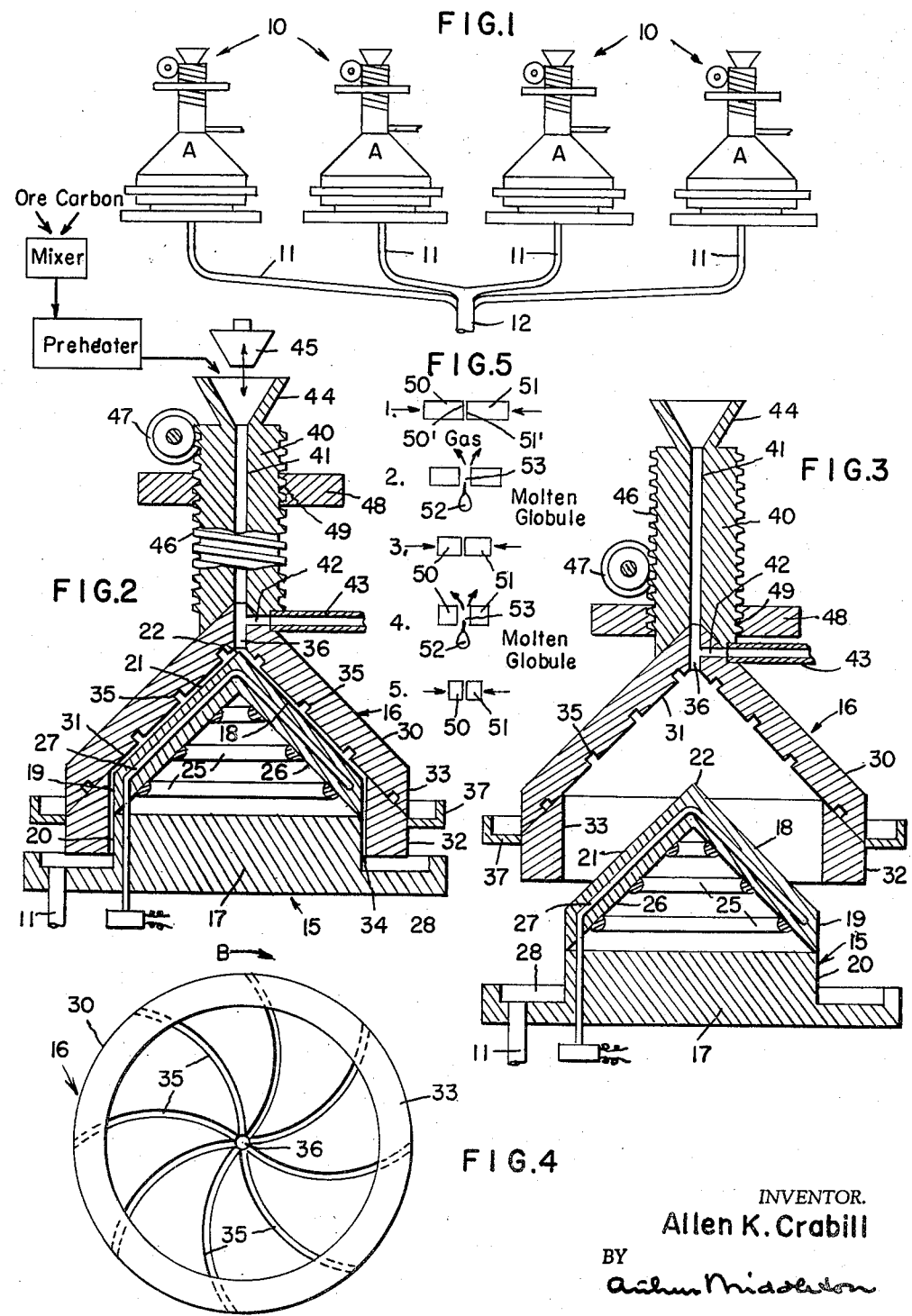

# United States Patent Office 2,946,581
Patented July 26, 1960

2,946,581

FURNACE FOR REDUCING METALLIC ORES

Allen K. Crabill, Lynchburg, Va., assignor to E. J. Lavino and Company, Philadelphia, Pa., a corporation of Delaware Filed Feb. 24, 1958, Ser. No. 717,063

14 Claims. (Cl. 266—9)

The present invention relates to a new and novel method and furnace for reducing metallic ores wherein finely divided oxides of metals and carbonaceous material are intimately mixed and the metal is reduced upon subjecting the metal to pressure and heat.

The reduction of oxides of metals is ordinarily carried out in blast furnaces which require a large capitalization investment and are quite expensive to operate, and further are often inefficient in treating certain high grade ores. It is, accordingly, desirable to eliminate large blast furnaces in such operations and various attempts have been made in the prior art to provide efficient reduction of ores by other means. For example, as disclosed in U.S. Patent 2,602,735, an initial bath of molten pig iron with its usual floating blanket of slag may be provided on a furnace hearth, and then the slag blanket is penetrated continually with bricks or other shapes having a pressure-compacted mixture of finely divided high grade iron ore, a carbon-bearing material and a binder. This type of process is not completely satisfactory since it requires the forming of the heated materials as briquettes or the like, and accordingly increases the expense of the operation since additional apparatus is necessary to manufacture the briquettes. In addition, this type of prior art process as well as all other known processes for reducing metallic ores involve the formation of undesirable slag. When dealing with complex ores, prior art methods and furnaces are also unsatisfactory since it is not possible to accurately and efficiently obtain differential smelting wherein different components of the ore may be separately reduced.

In the present method, a suitable metallic ore which it is desired to reduce is finely divided and mixed with a finely divided carbonaceous material such that intimate surface to surface contact is obtained between the particles of the ore and carbonaceous material. The mixture is then preferably preheated and the pressure is applied to the mixture while the mixture is heated at approximately the incandescent temperature of the carbonaceous material employed. The pressure and heat are applied to the mixture continually during the reduction process such that the pressure remains substantially constant throughout the operating cycle, whereby the intimate contact between the particles of ore and carbonaceous material is maintained throughout the operation of the device, thereby providing an efficient reduction of substantially all of the metallic oxide of the ore. When it is desired to reduce a complex ore, the mixture is subjected to a first substantially constant temperature at which one of the metallic components of the ore is reduced and subsequently the mixture is subjected to a second higher substantially constant temperature at which another component of the ore is reduced. Pressure is continually applied to the mixture during the different heating cycles. It is evident that a number of different oxide components of a complex ore may be differentially smelted in this manner if they have different reaction temperatures with either incandescent carbon or reducing gases.

The method according to the present invention eliminates the necessity of providing large blast furnaces, and also eliminates any additional apparatus which may be required in prior art processes for forming briquettes sinter, nodules or the like. In the present method, the metallic ore may be reduced and the impurities which are produced at the same time may be eliminated from the reduced material. In this manner, the amount of slag produced is negligible in comparison with known processes. Furthermore, complex ores may be accurately and efficiently reduced according to the present method such that the separate components of the complex ore may be sequentially reduced from the ore.

The furnace according to the present invention comprises a first fixed ore engaging means provided with an electric heating element whereby the temperature of the ore engaging surface of the first ore engaging means may be maintained at an accurately controlled substantially constant temperature during operation of the furnace. A second ore engaging means is mounted for reciprocation toward and away from the ore engaging means and is provided with a second ore engaging surface which is substantially complementary in configuration to the first ore engaging surface. The second ore engaging surface is also provided with a plurality of grooves therein for conducting the reduced metal and gases away from the furnace during operation.

The second ore engaging member is also mounted for rotary movement with respect to the first ore engaging means and is provided with a centrally disposed means for filling the chamber defined between the first and second ore engaging surfaces. An important novel concept of the present invention is the fact that the intimate surface to surface contact of the particles of ore and carbonaceous material is maintained during operation of the furnace. This is accomplished by providing the complementary shaped ore engaging surfaces of the ore engaging means with a novel configuration and urging the second ore engaging surface toward the first ore engaging surface and concurrently rotating the second ore engaging surface with respect to the first ore engaging surface such that a substantially constant and uniform pressure is applied to the mixture during operation. It is evident that as the ore is reduced during operation of the furnace, the molten metal and gas will be conducted from the furnace, thereby reducing the volume of the mixture. The novel interaction of the first and second ore engaging means insures that the surface to surface contact of the particles of the mixture is maintained by constantly agitating the particles and applying a constant pressure thereto.

In order to provide the desired action, it is necessary that the first and second ore engaging surfaces be substantially complementary to one another, and further, these surfaces have a tapering configuration which preferably takes the form of frusto-conical surfaces. Such a surface insures an even distribution of the mixture as the second ore engaging surface advances toward and rotates with respect to the first ore engaging surface during operation.

The finely divided particles of ore and carbonaceous material are initially inserted in a conventional mixer device which in turn feeds the output thereof into a preheater. The output of the preheater is connected to the feed means of the furnace such that the mixture has been initially preheated prior to disposing it in operative position within the furnace.

The furnace according to the present invention is simple in construction, yet reliable and efficient in operation. The invention furnace involves a relatively low capitalization cost in comparison to conventional blast furnaces and is considerably less expensive to operate than such known devices. The heating means employed in conjunction with the first ore engaging surface enables the temperature of this surface to be maintained very accurately at a substantially constant temperature and further provides a means for varying the temperature of the first ore engaging surface in order to provide differential smelting.

An object of the present invention is the provision of a new and novel method of reducing metallic ores wherein a complex ore may be reduced by differential smelting and the impurities which are produced conjointly with the reduced metal are minimized.

Another object is to provide a method of reducing metallic ores which eliminates the necessity of utilizing blast furnaces and the use of briquettes or the like.

A further object is the provision of a new and novel furnace which has a low capitalization cost and which is inexpensive to operate.

Yet another object is to provide a furnace for reducing metallic ores which is simple in construction, yet reliable and efficient in operation.

Still a further object is the provision of a furnace for reducing metallic ores wherein the temperature may be very accurately controlled.

Other objects and many of the attendant advantages of the present invention will become more obvious when considered in connection with the following specification and accompanying drawings wherein:

Fig. 1 is a view of a battery of parallel connected furnaces according to the present invention, Fig. 2 is a longitudinal section of one of the furnaces illustrated in Fig. 1, Fig. 3 is a view of the furnace shown in Fig. 2 with the upper ore engaging member in elevated position, Fig. 4 is a bottom view of the upper ore engaging member of the furnace, and Fig. 5 is a schematic illustration of the principle of operation of the method.

Referring now to the drawing wherein like reference characters designate corresponding parts throughout the several views, Fig. 1 illustrates a battery of furnaces 10 according to the present invention, each of which has the outlet thereof connected to a conduit 11, the conduits 11 each being connected to a central conduit 12 which may lead to a storage means which may be in the form of a heated container for maintaining the reduced metal in a molten state until it is desired to utilize the reduced metal.

Referring now to Fig. 2, the furnace comprises two ore engaging means indicated generally by reference numerals 15 and 16, member 15 being fixed to a suitable support means and including a raised circular portion 17 in the center thereof. Supported on the upper surface of the portion 17 is a hollow member 18 having side walls 19 which are flush with side walls 20 of portion 17 and having an upper ore engaging surface 21 of substantially conical configuration terminating in an apex 22 at the upper end thereof. The member 18 is formed of a suitable heat resistant material such as molded graphite, and an electrical resistance heating element 25 is disposed within the chamber defined between member 18 and portion 17. The heating element 25 is secured to the inner surface 26 of member 18 and is connected to a suitable source of electrical energy (not shown). A thermocouple 27 is embedded in member 18, and controls the flow of electricity to the heating coil in a well known manner, whereby the temperature of the upper ore engaging surface 21 may be maintained very accurately at a substantially constant temperature during operation. Raised portion 17 of ore engaging means 15 is surrounded by a channel 28 which is in communication with conduits 11 as shown in Fig. 1, whereby the molten metal produced during reduction operations is collected in channel 28 and subsequently conducted therefrom through conduits 11.

Second ore engaging means 16 includes a portion 30 formed of a material similar to that of member 18 having a second ore engaging surface 31 formed thereon of substantially conical configuration complementary to the first ore engaging surface 21. An annular rim member 32 is secured to the lower portion of the ore engaging surface 31 and has an inner cylindrical surface 33 which is parallel to the outer surface 19 of member 18, a clearance 34 being provided between surfaces 19 and 33. As seen most clearly in Fig. 4, a plurality of curved grooves 35 are formed in ore engaging surface 31 and extend from a central opening 36 formed centrally through portion 30 outwardly to the outer periphery of ore engaging means 16. During operation of the device, portion 30 rotates in the direction of arrow B as seen in Fig. 4, and, accordingly, it is apparent that grooves 35 curve outwardly and rearwardly of the direction of rotation of the second ore engaging means. This particular curvature of the grooves maintains the grooves open during operation since any tendency of the molten metal or gangue formed during the reduction operation to clog up the grooves will be alleviated due to the direction of rotation of the ore engaging means which tends to urge the molten metal and gangue outwardly within the grooves. An annular tray 37 is secured to the outer periphery of member 32 and serves as a gutter to collect the gangue which flows outwardly through grooves 35 during operation.

Ore engaging means 16 also includes an elongated upper screw stem portion 40 having a longitudinally extending feed passage 41 formed therethrough which is in communication with open end 36 formed in portion 30. A radially extending passage 42 is also in communication with feed passage 41 and a small hollow tube 43 extends radially outward from portion 40 for venting gases from feed passage 41 during operation. A funnel member 44 is formed at the upper end of portion 40 and is adapted to receive a sealing plug 45. The outer surface of the stem 40 is provided with threads 46 which are adapted to engage a conventional worm gear 47 whereby screw stem 40 is rotated upon rotation of worm 47 by any conventional means such as an electrical motor or the like (not shown). A fixed nut 48 is provided with internal threads 49 within which the screw stem 40 is threaded, whereby upon rotation of the stem 40 the second ore engaging means 16 will move upwardly or downwardly depending upon the direction of rotation of the means.

As indicated somewhat schematically in Fig. 2, the finely divided particles of ore and carbonaceous material are first placed in a conventional mixer which agitates these particles so as to thoroughly intermix them whereby the particles of ore and carbonaceous material are disposed in intimate surface to surface contact with one another. The mixed particles are then disposed within a conventional preheater means where the mixture is preheated. The mixer is then conveyed by suitable means to the funnel portion 44, whereupon it passes through feed passage 41. Ore engaging surfaces 21 and 31 are initially separated from one another with the lower edge of member 32 of ore engaging means 16 disposed slightly below the upper edge of surface 19 of ore engaging means 15. When the ore engaging means are in this relative position, a charging chamber is defined between ore engaging surfaces 21 and 31 and the inner cylindrical surface 33 of member 32. As the mixture passes through opening 36 in portion 30 of ore engaging means 16, it impinges upon the apex 22 of ore engaging surface 21 and consequently is evenly distributed about the charging chamber. The heating element 25 may be energized prior to charging the device to the desired temperature, or it may be heated subsequently to charging the device. When ore engaging surface 21 is at the desired operating temperature, ore engaging means 16 may be actuated by rotating worm gear 47, whereupon the screw stem 40 will rotate and move relative to fixed member 48, During the remainder of the operating cycle of the furnace, second ore engaging means 16 will continue to rotate and advance toward first ore engaging means 15. The rotary movement of means 16 insures that the particles of ore and carbonaceous material are agitated and uniformly distributed in the charging chamber between the ore engaging surfaces, and surface 31 advances toward surface 21 at a rate such that as the molten metal and gangue are removed from the mixture, the voids will be filled by further pressure on the mixture which tends to keep the remaining particles in intimate contact with one another. Gases which are produced during operation pass upwardly through opening 36, and sealing plug 45 which is inserted in funnel portion 44 subsequent to filling causes the gases to pass out through tube 43. Tube 43 may preferably be connected to the preheater whereby the exhaust gases from the furnace are utilized to heat the preheater means.

During operation, the reduced molten metal will flow upwardly through the mixture due to the pressure applied thereto and into grooves 35. The molten metal and gangue will move outwardly within the grooves and the molten metal will pass down through clearance 34 into channels 28 and subsequently into conduits 11. The gangue will be carried outwardly within the grooves and then be collected upon shelf 37.

The temperature of ore engaging surface 21 may be very accurately controlled and, accordingly, it is heated only to the point required to remove the particular metal which it is desired to reduce. By maintaining the temperature of the surface below the melting point of the impurities of the ore, reduction of the impurities is substantially limited, and in this manner, the amount of the impurities present in the reduced metal are minimized. If it is desired to reduce a complex ore, ore engaging surface 21 is maintained at a first temperature for a certain amount of time, and then is raised to a second temperature and maintained at this temperature for another period of time in order to reduce another component of the ore. Such successive stages of heating at different temperatures may be continued until all of the desired components have been removed from the ore. In most applications, the upper ore engaging surface 31 will be hot enough to maintain the molten metal within grooves 35 in a liquid state, but for certain types of metals, it may be necessary to heat this upper surface. For this purpose, the upper surface may, for example, be lowered into engagement with the heated lower ore engaging surface 21 to preheat surface 31. The surface tension of the globules of molten metal within the grooves will prevent the inclusion of foreign matter therein.

As indicated by the arrow A in Fig. 1, second ore engaging means 16 rotates in a counterclockwise direction whereby the grooves are maintained in open condition during operation. The foregoing described mode of operation of the furnace provides an efficient compaction of the mixture after charging and maintains such compaction throughout the operating cycle of the furnace. Subsequent to the completion of the operating cycle of the furnace, the second ore engaging means 16 is raised to the position shown in Fig. 3 wherein access may be gained to the ore engaging surface 21 such that it may be cleaned. The excess material which comprises mainly impurities and carbonaceous material may be cleaned off the surface 21 either by blowing the surface clean or by scraping it whichever is most efficient for the particular type of ore employed in the furnace.

Although the conical configuration of the ore engaging surfaces as disclosed is considered preferable, it is apparent that other tapered complementary surfaces may be employed. For example, surfaces 21 and 31 may be curved, whereupon the apex of the lower surface 21 would still be disposed adjacent opening 36.

In carrying out the method of the present invention, the ore and carbonaceous material are each ground so as to pass through approximately 40-mesh screen or even finer, if desired. The individual particles of ore and carbonaceous material are then thoroughly mixed with one another so as to provide proper contact between the particles. This mixing may obviously be accomplished with a number of different conventional type agitating apparatus, or even by hand, if necessary. The mixture is then preferably preheated by any conventional preheating means. The mixture is then heated and concurrently subjected to pressure through the reduction cycle, the pressure remaining substantially constant. The step of heating the mixture and concurrently applying a substantially constant pressure throughout the reduction cycle is preferably accomplished with the novel furnace disclosed herein, but it is apparent that other types of apparatus may also be employed for this purpose.

The method may be employed for reducing various metallic ores, and for example, two ores that could be employed with this method are cuprite ($Cu_2O$) and pyrolusite ($MnO_2$). The charge for copper would be approximately 8% impurities, 72% copper oxide and 20% carbon. The charge for manganese would be 18% impurities, 52% manganese oxide and 30% carbon. The amount of carbon required should be sufficient to combine with all the oxygen of the ore with some excess in case of poor contact between the ore and the carbon.

Referring now to Fig. 5 wherein the principle of operation of the present invention is illustrated, in the initial stage numbered 1, a particle of metallic ore 50 is disposed adjacent a particle 51 of carbonaceous material such as charcoal, coke or the like, with their surfaces 50' and 51' respectively closely adjacent to one another or in abutting relationship. In the next stage numbered 2, heat applied to the mixture causes the molten globule 52 to be formed which will be forced out of the mixture by the pressure applied thereto and the CO or $CO_2$ gas will be liberated passing upwardly and out of the mixture. As this occurs, a gap indicated by reference numeral 53 is created between the adjacent surfaces of particles 50 and 51. This gap will prevent further reaction between the metallic particle and carbonaceous particle and this factor has limited the degress of reduction which can be accomplished in prior art applications. However, according to the present invention, pressure is continually applied to the mixture during the heating cycle, and consequently particles 50 and 51 are pressed toward one another such that the surfaces 50' and 51' are again disposed closely adjacent one another or in actual abutting relationship as shown in the stage numbered 3. In the stage numbered 4, another molten globule 52 has been formed and more gas has been liberated, thereby creating another gap 53 between the particles 50 and 51. Continuing pressure application to the mixture will again urge particles 50 and 51 toward one another such that the adjacent surfaces are again disposed in operative relationship to one another as illustrated in stage numbered 5. In this manner, the individual particles of ore and carbonaceous material are continually urged into surface to surface contact whereby the metal is substantially completely and efficiently reduced.

As pointed out previously, when it is desired to reduce a complex ore such as ferruginous manganese ore, the ore may be heated for a certain amount of time at different temperatures in order to separately remove the various components of the ore. For example, when iron oxide is reduced to metallic iron, the mixture may first be subjected to a temperature of approximately 2400° F. in order to remove the iron. The mixture may then be subjected to a second higher temperature of 2800° F. to remove the metallic manganese. It is apparent that such successive stages of heating as desired may be carried out to remove the separate components of the ore.

The theory on which the process of this invention was conceived is that at the melting temperature of any metal inactive in air, the oxygen combined with the metal in the ore has greater affinity for incandescent carbon than it does for the metal.

It is apparent from the foregoing that there is provided a new and novel method and furnace for reducing metallic ores wherein the reduced impurities are minimized and the various components of a complex ore may be separately reduced. The method according to the present invention eliminates the necessity of providing blast furnaces and briquettes or the like. The novel furnace of the invention provides low capitalization cost and is inexpensive to operate. The furnace is simple in construction, yet is reliable and efficient in operation, and the furnace provides an accurate control of the reduction temperature.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A furnace for reducing metallic ores which comprises first ore engaging means having a first ore engaging surface, second ore engaging means having a second ore engaging surface which is substantially complementary in configuration to said first surface, means for moving one of said ore engaging means toward the other of said ore engaging means and for rotating one of said ore engaging means with respect to the other of said ore engaging means, means for heating one of said ore engaging surfaces, and means for removing reduced metal and gases from said furnace during operation thereof.

2. A furnace as defined in claim 1 including means for maintaining said heated ore engaging surface at a substantially constant temperature.

3. A furnace as defined in claim 1 wherein said last mentioned means comprises at least one groove formed in the ore engaging surface of one of said ore engaging means.

4. A furnace for reducing metallic ores which comprises a first ore engaging means having a first ore engaging surface, electrically operated heating means for heating said first ore engaging surface and maintaining said first ore engaging surface at a substantially constant temperature, a second elongated ore engaging means having a second ore engaging surface which is substantially complementary in configuration to said first surface, means for moving said second ore engaging means longitudinally with respect to said first ore engaging means and rotating said second ore engaging means with respect to said first ore engaging means, said second ore engaging surface having a plurality of curved grooves formed therein, said grooves extending from a point adjacent the center of said second ore engaging surface outwardly and curving rearwardly of the direction of rotation of said second ore engaging means and extending to the other periphery of said second ore engaging means.

5. A furnace as defined in claim 4 including metal outlet means in communication with the outer portions of said grooves for conducting reduced metal from the furnace, and gas outlet means in communication with the inner portions of said grooves for conducting gas from the furnace.

6. A furnace as defined in claim 4 wherein each of said first and second ore engaging surfaces are substantially conical in configuration.

7. A furnace as defined in claim 6 wherein said second ore engaging means has a longitudinally extending feed passage formed therethrough, the lower end of said passage opening adjacent the apex of said first ore engaging conical shaped surface.

8. A furnace as defined in claim 7 including means for sealing said passage.

9. Metal ore reducing furnace apparatus comprising in combination, a pair of superposed structures having opposed ore crushing surfaces, the lower structure having a chamber therein, said surfaces being conical and the lower one extending upwardly into the upper one, means within said chamber for raising the temperature of the crushing surface of the lower structure to an ore fusion level, means for rotating one of the structures relative to the other, a screw stem rising from the center of the upper structure, and means coacting with said screw stem for axially moving said stem and the upper structure while the latter is rotating.

10. The invention according to claim 9, with means for feeding ore through the screw stem onto the crushing surface of said lower structure.

11. Metal ore reducing furnace apparatus comprising in combination, a pair of superposed structures having opposed ore crushing surfaces, the lower structure having a chamber therein, said surfaces being conical and the lower one extending upwardly into the upper one, means within said chamber for raising the temperature of the crushing surface of the lower structure to an ore fusion level, means for rotating one of the structures relative to the other, a screw stem rising from the center of the upper structure, a fixed nut having the screw stem threaded therethrough, and gear means in threaded connection with the screw stem for rotating the latter and the upper structure and for effecting the axial movement of the upper structure relative to the lower structure through the said threaded engagement of the stem with the nut.

12. Metallic ore reducing furnace apparatus comprising a base structure, a hollow conical body upon and rising from the base structure, a hollow upper body having a conical chamber therein into which the underlying conical body extends, the surface of said conical chamber and the outer surface of the conical body being cooperatively related to provide ore crushing surfaces, said upper body having an annular part depending from the lower portion of the wall of the conical chamber and spaced from and concentric with the lower part of the conical body and a circular surface of the base structure forming a molten ore discharge passage, said base structure including an annular molten metal receiving tray below said molten metal discharge passage, means within the hollow conical body for heating the latter to ore fusing temperature, a gangue receiving tray encircling the upper body around the lower portion of the conical wall thereof, means forming a part of said conical wall for conveying gangue material to the lower part thereof for discharge into the last mentioned tray, means for rotating the upper body relative to the hollow conical body, and means for moving the upper body toward the top surface of the hollow conical body for effecting the crushing of ore between the latter and the conical chamber wall surface.

13. The invention according to claim 12, wherein the last stated means comprises a threaded stem joined to and rising from the center of the upper body, a fixed nut having said stem threaded therethrough, and means for rotating the stem.

14. The invention according to claim 13, wherein said stem has an ore feeding passage extending axially therethrough and opening into said conical chamber for discharge onto the surface of the conical body, and an ore receiving hopper on the top of said stem having a discharge outlet leading into said axial passage.

References Cited in the file of this patent

UNITED STATES PATENTS

| 1,114,502 | Menne | Oct. 20, 1914 |
| 1,277,047 | Dawson | Aug. 27, 1918 |
| 2,811,437 | Fessler | Oct. 29, 1957 |
| 2,845,262 | Fessler | July 29, 1958 |